(12) United States Patent
Yoshikawa et al.

(10) Patent No.: US 9,829,736 B2
(45) Date of Patent: Nov. 28, 2017

(54) DISPLAY DEVICE (71) Applicant: Sakai Display Products Corporation, Sakai-shi, Osaka (JP)

(72) Inventors: Takahiro Yoshikawa, Sakai (JP); Takayuki Nakazawa, Sakai (JP); Kazuhiko Negoro, Sakai (JP); Mayumi Hori, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/411,029

(22) PCT Filed: Jan. 29, 2014

(86) PCT No.: PCT/JP2014/051922
§ 371 (c)(1),
(2) Date: Dec. 23, 2014

(87) PCT Pub. No.: WO2014/123039
PCT Pub. Date: Aug. 14, 2014

(65) Prior Publication Data
US 2016/0004119 A1 Jan. 7, 2016

(30) Foreign Application Priority Data
Feb. 6, 2013 (JP) .................. 2013-021682

(51) Int. Cl.
*G02F 1/335* (2006.01)
*G02F 1/1335* (2006.01)
(Continued)

(52) U.S. Cl.
CPC ...... *G02F 1/133504* (2013.01); *G02F 1/1339* (2013.01); *G02F 1/133606* (2013.01);
(Continued)

(58) Field of Classification Search
CPC ............... G02F 1/133; G02F 1/133606; G02F 1/133504; G02F 1/1339; G02F 1/133607; G02F 1/133615
See application file for complete search history.

(56) References Cited

U.S. PATENT DOCUMENTS 8,045,094 B2 * 10/2011 Teragawa ................ 349/64
9,207,386 B2 * 12/2015 Kim ................ G02B 6/0053

FOREIGN PATENT DOCUMENTS

JP 2000-214327 A 8/2000
JP 2009-048152 A 3/2009
(Continued)

*Primary Examiner* — Dung Nguyen
(74) *Attorney, Agent, or Firm* — Rudy J. Ng; Bret E. Field; Bozicevic, Field & Francis LLP (57) ABSTRACT

Provided is a display device comprising a liquid-crystal panel and an optical sheet member including multiple stacked optical sheets emitting light from a light source toward the liquid-crystal panel, which can alleviate unevenness in light even in the case where, for example, light with such unevenness is emitted from the optical sheet member due to warps or wrinkles generated in the optical sheet member caused by heat generated by the light source.

A diffusion sheet is provided between a liquid-crystal panel and an optical sheet member with a gap from the optical sheet member. The light emitted through the optical sheet member is diffused by the diffusion sheet and gap, and then enters the liquid-crystal panel.

7 Claims, 6 Drawing Sheets (51) Int. Cl.
*G02F 1/1339* (2006.01)
*F21S 2/00* (2016.01)
*F21V 8/00* (2006.01)

(52) U.S. Cl.
CPC ............... *F21S 2/00* (2013.01); *G02B 6/0001* (2013.01); *G02F 2201/54* (2013.01)

(56) References Cited

FOREIGN PATENT DOCUMENTS

| | | |
|---|---|---|
| JP | 2010-108897 A | 5/2010 |
| JP | 2012-178272 A | 9/2012 |

* cited by examiner

FIG. 6

DISPLAY DEVICE

This application is the national phase under 35 U.S.C. §371 of PCT International Application No. PCT/JP2014/051922 which has an International filing date of Jan. 29, 2014 and designated the United States of America.

BACKGROUND

1. Technical Field

The present invention relates to a display device including a liquid-crystal panel with one surface on which an image is displayed, and an optical sheet member disposed, opposite to another surface of the liquid-crystal panel and having multiple stacked optical sheets, to emit light from a light source toward the liquid-crystal panel.

2. Description of Related Art

In recent years, a display device having a liquid-crystal panel on which an image is displayed includes an optical sheet member which diffuses and condenses light from a light source to make the light uniform as it enters the liquid-crystal panel.

The optical sheet member includes, for example, an optical sheet such as a prism sheet or a micro lens sheet for condensing the light from a light source, and an optical sheet such as a diffusion sheet for diffusing the light from a light source.

Such an optical sheet member is, however, expanded by, for example, heat from the light source, resulting in warps or wrinkles in the optical sheet member, which may cause unevenness in light to appear on the liquid-crystal panel.

To address this, Japanese Patent Application Laid-Open No. 2010-108897 discloses a display device in which an elastic member that holds an optical sheet is provided and the pressing force of the elastic member is adjusted, to suppress warps in the optical sheet and to improve the occurrence of unevenness in light.

SUMMARY

Though the display device in Japanese Patent Application Laid-Open No. 2010-108897 as described above may suppress warps or wrinkles in the optical sheet, it is not possible to prevent unevenness in light caused by warps or wrinkles from occurring if they are once produced in an optical sheet.

The present invention has been made in view of the circumstances described above. An object of the invention is to provide a display device including a liquid-crystal panel and an optical sheet member in which multiple optical sheets are stacked that emit light from a light source toward the liquid-crystal panel, comprising a diffusion sheet for diffusing light entering through the optical sheet member to make the light enter the liquid-crystal panel, disposed between the liquid-crystal panel and the optical sheet member with a predetermined distance from the optical sheet member, to further diffuse the light by the diffusion sheet even in the case where the heat generated by the light source causes warps or wrinkles in the optical sheet member and thus uneven light is emitted from the optical sheet member, so as to alleviate such unevenness in light.

A display device according to the present invention including a liquid-crystal panel with one surface on which an image is displayed, and an optical sheet member disposed opposite to another surface of the liquid-crystal panel and including multiple stacked optical sheets emitting light from a light source toward the liquid-crystal panel is characterized by comprising a diffusion sheet provided between the liquid-crystal panel and the optical sheet member and diffusing light entering through the optical sheet member and making the light enter the liquid-crystal panel, and is characterized in that a gap is formed between the diffusion sheet and the optical sheet member.

According to the present invention, the light emitted through the optical sheet member is diffused again by the diffusion sheet and the gap before entering the liquid-crystal panel. Thus, even in the case where the heat generated from the light source causes warps or wrinkles in the optical sheet member, which results in unevenness in the light emitted from the optical sheet member, the light is diffused again by the diffusion sheet and the gap, alleviating such unevenness in light.

The display device according to the present invention is characterized in that the optical sheet member includes an optical sheet, located on the diffusion sheet side, for condensing the light from the light source and emitting the light to the diffusion sheet.

According to the present invention, the light emitted through the optical sheet for condensing the light from the light source and emitting the light to the diffusion sheet is diffused again by the diffusion sheet and the gap before entering the liquid-crystal panel. That is, in the case where the heat generated by the light source causes warps or wrinkles in the optical sheet, which results in unevenness in the light emitted from the optical sheet, the light is diffused again by the diffusion sheet and the gap, alleviating such unevenness in light.

The display device according to the present invention is characterized in that the optical sheet member includes an optical sheet, located on the diffusion sheet side, for diffusing the light from the light source and emitting the light to the diffusion sheet.

According to the present invention, the light emitted through the optical sheet for diffusing the light from the light source and emitting the light to the diffusion sheet is diffused again by the diffusion sheet before entering the liquid-crystal panel. That is, in the case where the heat generated by the light source causes warps or wrinkles in the optical sheet, which results in unevenness in the light emitted from the optical sheet, the light is diffused again by the diffusion sheet and the gap, alleviating such unevenness in light.

The display device according to the present invention is characterized in that the diffusion sheet is in contact with said another surface of the liquid-crystal panel.

According to the present invention, such a configuration that the diffusion sheet is in contact with said another surface of the liquid-crystal panel allows the heat in the diffusion sheet to be distributed to the liquid-crystal panel while downsizing the entire device.

The display device according to the present invention is characterized by comprising a spacer supporting the liquid-crystal panel and the diffusion sheet and forming the gap between the diffusion sheet and the optical sheet member, and is characterized in that the spacer includes: a contact surface being in contact with a circumferential part of the above-described another surface of the liquid-crystal panel; and a step at which a circumferential part of the diffusion sheet is positioned.

According to the present invention, when the circumferential part of the above-described another surface of the liquid-crystal panel is in contact with the contact surface of the spacer and the circumferential part of the diffusion sheet is located at the step, the diffusion sheet makes contact with the above-described another surface of the liquid-crystal panel. The spacer supports the liquid-crystal panel and the diffusion sheet in such a state, while the gap is formed between the diffusion sheet and the optical sheet member.

The display device according to the present invention is characterized by comprising: a support for supporting the liquid-crystal panel, the diffusion sheet and the optical sheet member; and a spacer frame located between the diffusion sheet and the optical sheet member and forming the gap, and is characterized in that the support includes: a contact surface being in contact with a circumferential part of the above-described another surface of the liquid-crystal panel; a first step at which a circumferential part of the diffusion sheet is positioned; and a second step at which a circumferential part of the optical sheet member is positioned.

According to the present invention, in the state where the circumferential part of the above-described another surface of the liquid-crystal panel is in contact with the contact surface of the support, the circumferential part of the diffusion sheet is located at the first step, and the circumferential part of the optical sheet member is located at the second step, the diffusion sheet makes contact with the above-described another surface of the liquid-crystal panel, and the gap is formed between the diffusion sheet and the optical sheet member by the spacer frame.

According to the present invention, even in the case where warps or wrinkles occur in the optical sheet member for some reason and uneven light is emitted from the optical sheet member, the light is further diffused by the diffusion sheet, allowing uniform light to enter the liquid-crystal panel.

The above and further objects and features will move fully be apparent from the following detailed description with accompanying drawings.

DETAILED DESCRIPTION

The display device according to embodiments of the present invention will now be described below in detail with reference to the drawings by taking a case where the display device is applied to a so-called liquid-crystal display device.

Embodiment 1

Figure 1:
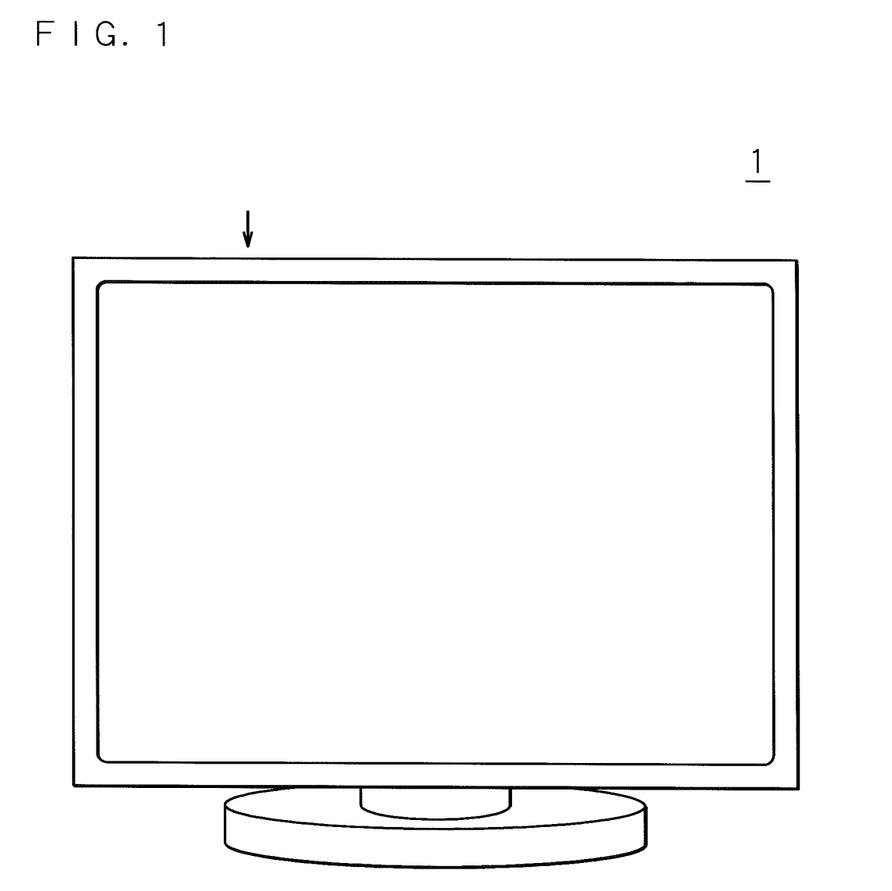
FIG. 1 is a front view of a liquid-crystal display device according Embodiment 1 of the present invention.
Figure 2:
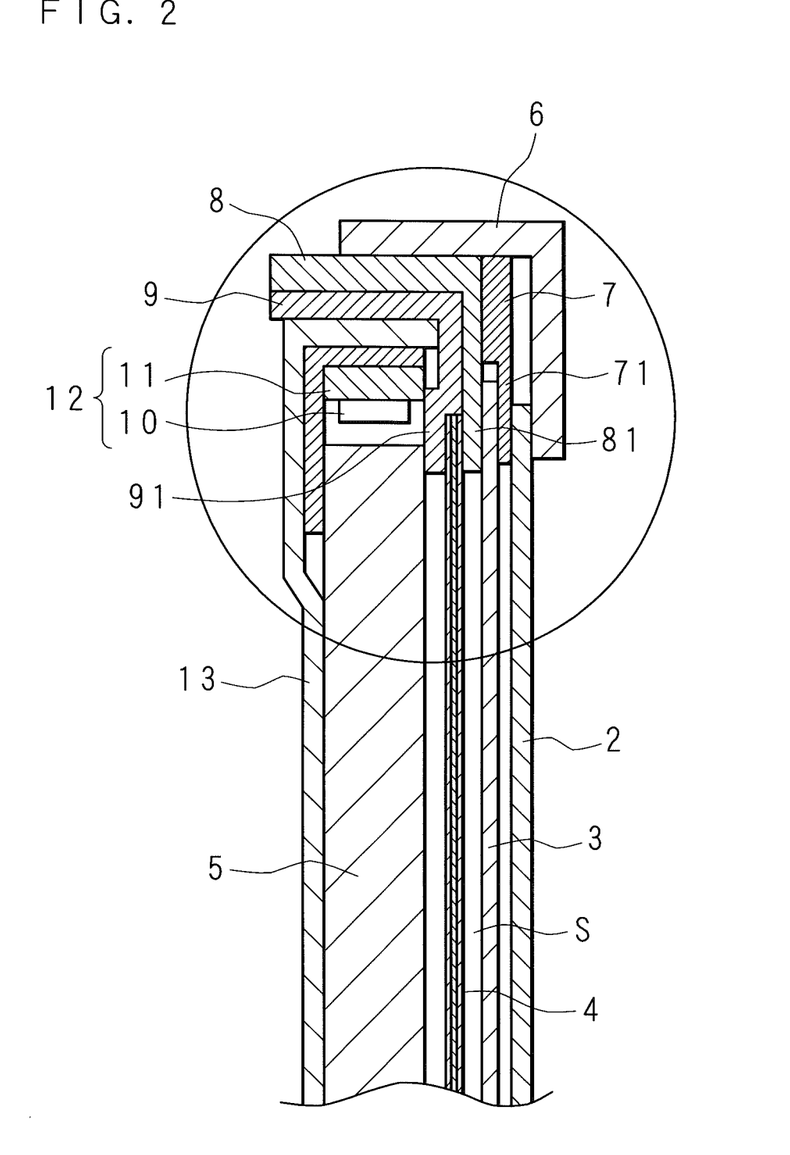
FIG. 2 is a vertical cross sectional view of the main part of the liquid-crystal display device in the direction of the arrow shown in FIG. 1.
Figure 3:
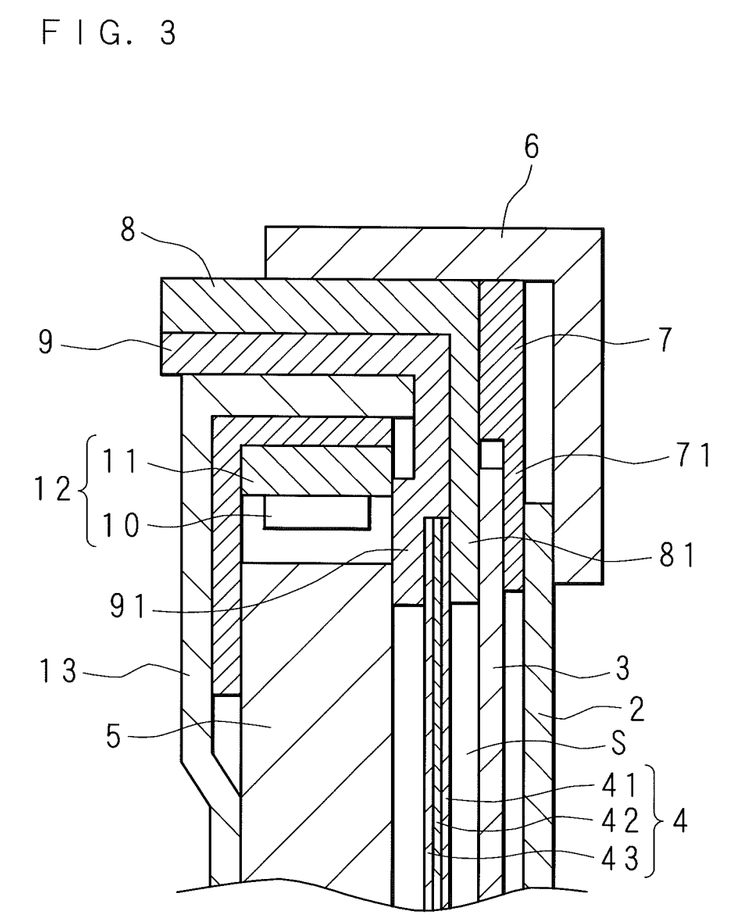
FIG. 3 is an enlarged view of a circular portion in the vertical cross sectional view of the main part illustrated in FIG. 2.

FIG. 1 is a front view of a liquid-crystal display device according to Embodiment 1 of the present invention, and FIG. 2 is a vertical cross sectional view of the main part of the liquid-crystal display device in the direction of the arrow shown in FIG. 1. FIG. 3 is an enlarged view of a circular portion in the vertical cross sectional view of the main part illustrated in FIG. 2. The reference numeral 1 in the drawings denotes the liquid-crystal display device according to the present invention. Moreover, for convenience of description, the up-down direction in the drawings is regarded as a vertical direction, whereas the left-right direction in the drawings is regarded as a horizontal direction.

A liquid-crystal display device 1 according to Embodiment 1 of the present invention, as illustrated in FIG. 1, includes a rectangular liquid-crystal panel 2 with one surface on its front side displaying an image. On the rear side of the liquid-crystal panel 2, an optical sheet member 4 is located opposite to the other surface of the liquid-crystal panel 2. A diffusion sheet 3 is provided between the liquid-crystal panel 2 and the optical sheet member 4. That is, the other surface of the liquid-crystal panel 2 and one surface of the diffusion sheet 3 are opposed to each other, while the other surface of the diffusion sheet 3 and one surface of the optical sheet member 4 are opposed to each other. Furthermore, in the other surface side of the optical sheet member 4, a light source 10 and a light guide plate 5 are located, the light source 10 and the light guide plate 5 being accommodated in a cabinet 13.

At the liquid-crystal panel 2, a circumferential part of the one surface is covered by an outer cover 6. The outer cover 6 has an L-shaped vertical cross section, one end thereof being in contact with the circumferential part of the liquid-crystal panel 2. That is, the liquid-crystal panel 2 is configured to be held between the outer cover 6 and a frame 7 which will be described later.

Moreover, the liquid-crystal panel 2 is provided with a polarization plate (not illustrated) on the above-described other surface, and is configured to separate the entering light into P wave (horizontal polarization component) and S wave (vertical polarization component) using the polarization plate, only the P wave going out toward the one surface while the S wave being absorbed by the polarization plate. The liquid-crystal panel 2 may be, for example, an electrophoretic liquid-crystal panel.

In the other surface side of the liquid-crystal panel 2, the frame 7 is provided to support the liquid-crystal panel 2 by being in contact with the circumferential part of this other surface of the liquid-crystal panel 2. The frame 7 has a hollow rectangular shape and the other surface of the liquid-crystal panel 2 is in contact with the front surface of the frame 7 in the liquid-crystal panel 2 side, whereas a stepped surface 71 which is in contact with the circumferential part of the diffusion sheet 3 is formed on the rear surface thereof.

The diffusion sheet 3 diffuses light entering from the light source 10 through the optical sheet member 4 and emits the light to the liquid-crystal panel 2. The diffusion sheet 3 is comprised of, for example, DBEF (registered trademark). And the diffusion sheet 3 is at least larger than the display area of the liquid-crystal panel 2, and has a substantially rectangular shape. The diffusion sheet 3 is separated from the liquid-crystal panel 2 by the frame 7.

A spacer 8 is located in the other surface side of the diffusion sheet 3. The spacer 8 has a hollow rectangular shape and has a flat part 81 of which one surface is in contact with the circumferential part of the other surface of the diffusion sheet 3. The end of the spacer 8 outer than the flat part 81 extends toward the rear side so that the flat part 81 has an L-shaped vertical cross section. The diffusion sheet 3 is held at its circumferential part between one surface of the flat part 81 of the spacer 8 and the stepped surface 71 of the frame 7. The optical sheet member 4 and a holding part 9 holding the optical sheet member 4 are in contact with the other surface of the flat part 81 of the spacer 8.

The optical sheet member 4 is a known material which diffuses and condenses light emitted from the light source 10, and emits more uniform light toward the liquid-crystal panel 2. For example, the optical sheet member 4 is comprised of multiple stacked optical sheets, including a first diffusion sheet 41 located in the other surface side of the diffusion sheet 3 and having one surface opposite to the other surface of the diffusion sheet 3, a prism sheet 42 located in the other surface side of the first diffusion sheet 41 and having one surface being in contact with the first diffusion sheet 41, and a second diffusion sheet 43 located in the other surface side of the prism sheet 42 and having one surface being in contact with the other surface of the prism sheet 42.

The second diffusion sheet 43 is an optical sheet for diffusing the light entering from the light source 10 through the light guide plate 5 in its other surface side and making the light enter the prism sheet 42. Moreover, the prism sheet 42 is an optical sheet for condensing the light entering through the second diffusion sheet 43 and emitting the light toward the diffusion sheet 3. The light that passed through the prism sheet 42 enters the first diffusion sheet 41 vertically with respect to the prism sheet 42.

The first diffusion sheet 41 located nearest to the diffusion sheet 3 is an optical sheet for further diffusing the light entering through the prism sheet 42 to make the luminance distribution of the light more uniform and emitting the light toward the diffusion sheet 3.

The holding part 9 is a hollow rectangular shape and has a bent part 91 bent in a staircase fashion for holding the optical sheet member 4. The end part of the holding part 9 located outer than the bent part 91 extends toward the rear side. The bending of the bent part 91 has a shape contouring to the end part of the optical sheet member 4, and the bent part 91 is so configured that one surface thereof in the flat part 81 side is in contact with the circumferential part of the other surface of the second diffusion sheet 43.

Accordingly, the optical sheet member 4 is held by the holding part 9 (bent part 91) and the spacer 8 (flat part 81). Therefore, a gap S is formed between the optical sheet member 4 and the diffusion sheet 3 by the distance corresponding to the thickness of the flat part 81. The gap S is, for example, 0.5 mm.

In the other surface side of the optical sheet member 4, the rectangular light guide plate 5 is located. The light guide plate 5 guides the light emitted by the light source 10 to the optical sheet member 4 (liquid-crystal panel 2). For example, the light guide plate 5 may be so configured to have an emitting surface on one surface in the other surface side of the optical sheet member 4, on which a pattern is so formed that the light entering from the light source 10 travels in the direction of the liquid-crystal panel 2. This allows the light guide plate 5 to change the light entering from the light source 10 into flat light and to uniformly transmit the light to the optical sheet member 4 through the emitting surface. It is noted that a reflection sheet (not illustrated) is provided in the other surface side of the light guide plate 5.

Furthermore, the light guide plate 5 is made from, for example, acrylic resin with high transparency, and reflection dots for irregularly reflecting the light entering from the light source 10 and emitting the light from the emitting surface of the light guide plate 5 is attached to the other surface of the light guide plate 5.

A light source unit 12 is located near each of the upper side surface of the light guide plate 5 and the lower side surface of the light guide plate 5. The light source unit 12 has a substrate 11 arranged to be opposite to each of the upper and lower side surfaces of the light guide plate 5, and the light source 10 mounted on the substrate 11.

The light source 10 corresponds to, for example, a cold cathode fluorescent lamp (CCFL), an external electrode fluorescent lamp (EEFL) or a light emitting diode (LED).

The liquid-crystal display device 1 according to Embodiment 1 has a configuration as described above, which can address the case where unevenness in light occurs due to the warps or wrinkles in the optical sheet member 4 caused by thermal expansion, as described above.

In other words, when the liquid-crystal display device 1 is operated, the light source 10 generates heat together with light. Here, the heat generated by the light source 10 causes thermal expansion at the optical sheet member 4 located near the light source 10 (specifically, in the vicinity of the light source 10), which produces warps or wrinkles in the optical sheet member 4, resulting in unevenness in the light emitted from the optical sheet member 4.

The liquid-crystal display device 1 according to Embodiment 1 is, as described above, provided with the diffusion sheet 3 in one surface side of the optical sheet member 4 with a gap S between the optical sheet member 4 and the diffusion sheet 3, which can eliminate the unevenness in light emitted from the optical sheet member 4. This will be described below in detail.

The light emitted from the optical sheet member 4 is diffused while repeating reflection to the optical sheet member 4 side by the diffusion sheet 3 and the gap S. In other words, among the entered light, the diffusion sheet 3 transmits P wave therethrough and reflects S wave. The S wave reflected by the diffusion sheet 3 and directed toward the side of the optical sheet member 4 is condensed and reflected by the optical sheet member 4 (prism sheet 42) and is directed again to the diffusion sheet 3. The P wave component contained in the reflection light transmits through the diffusion sheet 3 and is emitted to the liquid-crystal panel 2, while the S wave is reflected again toward the side of the optical sheet member 4. Such a procedure is repeated to diffuse light, and the diffused light is emitted from the diffusion sheet 3 toward the liquid-crystal panel 2, which eliminates the unevenness in light to make the luminance distribution uniform in the liquid-crystal panel 2.

Furthermore, in the liquid-crystal display device 1 according to Embodiment 1, the diffusion sheet 3 is separated by the gap S from the optical sheet member 4, and is thus located away from the light source 10, i.e. a heat source, which can suppress the thermal expansion of the diffusion sheet 3 itself.

Due to such a synergistic effect, even in the case where unevenness occurs in the light emitted from the optical sheet member 4 due to warps or wrinkles in the optical sheet member 4, such unevenness in light is alleviated by the diffusion sheet 3 and the gap S, and is not viewed by the user at the front side of the liquid-crystal panel 2, which will not make the user feel uncomfortable.

Embodiment 2

The liquid-crystal display device 1 according to Embodiment 1 described an example where the optical sheet member 40 is a known material and is comprised of multiple optical sheets including the first diffusion sheet 41, the prism sheet 42 and the second diffusion sheet 43. The present invention is, however, not limited thereto.

Among the first diffusion sheet 41, the prism sheet 42 and the second diffusion sheet 43 constituting the optical sheet member 40 according to Embodiment 1, the prism sheet 42 (or micro lens sheet) is the one that is easily warped or wrinkled by thermal expansion in practice.

Figure 4:
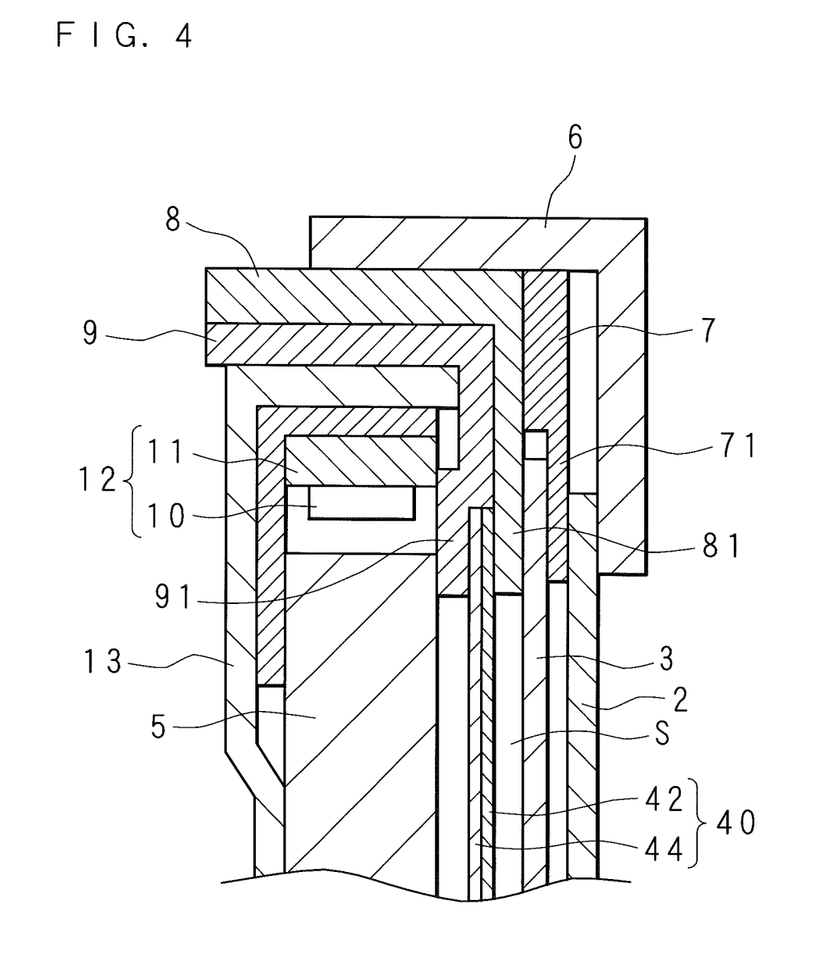
FIG. 4 is a partial vertical cross sectional view of the main part of a liquid-crystal display device according to Embodiment 2 of the present invention.

Accordingly, in the liquid-crystal display device 1 according to Embodiment 2, the optical sheet member 40 is constituted by the prism sheet 42 and a diffusion film 44. The structure of the liquid-crystal display device 1 according to Embodiment 2 will now be described below in detail.

FIG. 4 is a partial vertical cross sectional view of the main part of a liquid-crystal display device 1 according to Embodiment 2 of the present invention.

In the liquid-crystal display device 1 according to Embodiment 2, an optical sheet member 40 is located on the rear side of a liquid-crystal panel 2 as in the case with Embodiment 1, and a diffusion sheet 3 is provided between the liquid-crystal panel 2 and an optical sheet member 40, separated from the optical sheet member 40 with a gap S. Moreover, a light source 10 and a light guide plate 5 are located in the other surface side of the optical sheet member 40, the light source 10 and light guide plate 5 being accommodated in the cabinet 13.

The diffusion sheet 3 diffuses the light from the light source 10 entering through the optical sheet member 40 and emits the light to the liquid-crystal panel 2. The diffusion sheet 3 is made from, for example, DBEF (registered trademark). The diffusion sheet 3 has a substantially rectangular shape and is at least larger than the display area of the liquid-crystal panel 2.

The optical sheet member 40 diffuses and condenses the light generated from the light source 10, and emits more uniform light toward the liquid-crystal panel 2. For example, the optical sheet member 40 is comprised of multiple stacked optical sheets, and includes a prism sheet 42 located in the other surface side of the diffusion sheet 3 and having one surface opposing to the other surface of the diffusion sheet 3, and the diffusion film 44 located in the other surface side of the prism sheet 42 and having one surface being in contact with the other surface of the prism sheet 42.

The diffusion film 44 is an optical sheet for diffusing the light entering form the light source 10 through the light guide plate 5 in the other surface side thereof and making the light enter the prism sheet 42. Moreover, the prism sheet 42 is an optical sheet for condensing the light entering through the diffusion film 44 and emitting the light toward the diffusion sheet 3. The light that passed through the prism sheet 42 enters the diffusion sheet 3 vertically with respect to the prism sheet 42.

Furthermore, a gap S is formed between the optical sheet member 40 and the diffusion sheet 3, as in Embodiment 1. The gap S is, for example, 0.5 mm.

The other parts that are similar to those in Embodiment 1 will be denoted by the same reference numbers and will not be described in detail.

As the liquid-crystal display device 1 according to Embodiment 2 has a configuration as described above, this may address the case where unevenness occurs in light due to warps or wrinkles in the optical sheet member 40 caused by thermal expansion.

In other words, when the liquid-crystal display device 1 is operated, the prism sheet 42 is expanded by the heat, generated by the light source 10, at the optical sheet member 40 (more specifically, in the vicinity of the light source 10) located near the light source 10, warps or wrinkles are generated in the prism sheet 42, causing unevenness in the light emitted from the optical sheet member 40.

As the liquid-crystal display device 1 according to Embodiment 2 is, as described above, provided with the diffusion sheet 3 separated from the front side of the optical sheet member 40 with a gap S, the light emitted from the optical sheet member 40 is diffused by the diffusion sheet 3 and the gap S while repeating reflection to the side of the optical sheet member 40. That is, as described above, the diffusion sheet 3 transmits P wave therethrough and reflects S wave among the entered light. The S wave reflected by the diffusion sheet 3 and directed toward the side of the optical sheet member 40 is condensed and reflected by the optical sheet member 40 (prism sheet 42), and directed again to the diffusion sheet 3. The P wave component contained in the reflection light is transmitted through the diffusion sheet 3 and emitted to the liquid-crystal panel 2, and the S wave is again reflected toward the side of the optical sheet member 40. Such a procedure is repeated to diffuse light, and the diffused light is emitted from the diffusion sheet 3 toward the liquid-crystal panel 2, so that the unevenness in light is eliminated to make the luminance distribution uniform in the liquid-crystal panel 2.

Furthermore, in the liquid-crystal display device 1 according to Embodiment 2, the diffusion sheet 3 is provided while separated from the optical sheet member 40 with the gap S, and is thus located away from the light source 10, i.e. a heat source, which can suppress the thermal expansion of the diffusion sheet 3 itself.

Due to such a synergistic effect, even in the case where unevenness occurs in the light emitted from the optical sheet member 40 due to warps or wrinkles in the optical sheet member 4, such unevenness in light is alleviated by the diffusion sheet 3 and the gap S, and is not viewed by the user at the front side of the liquid-crystal panel 2, which will not make the user feel uncomfortable.

Embodiment 3

Figure 5:
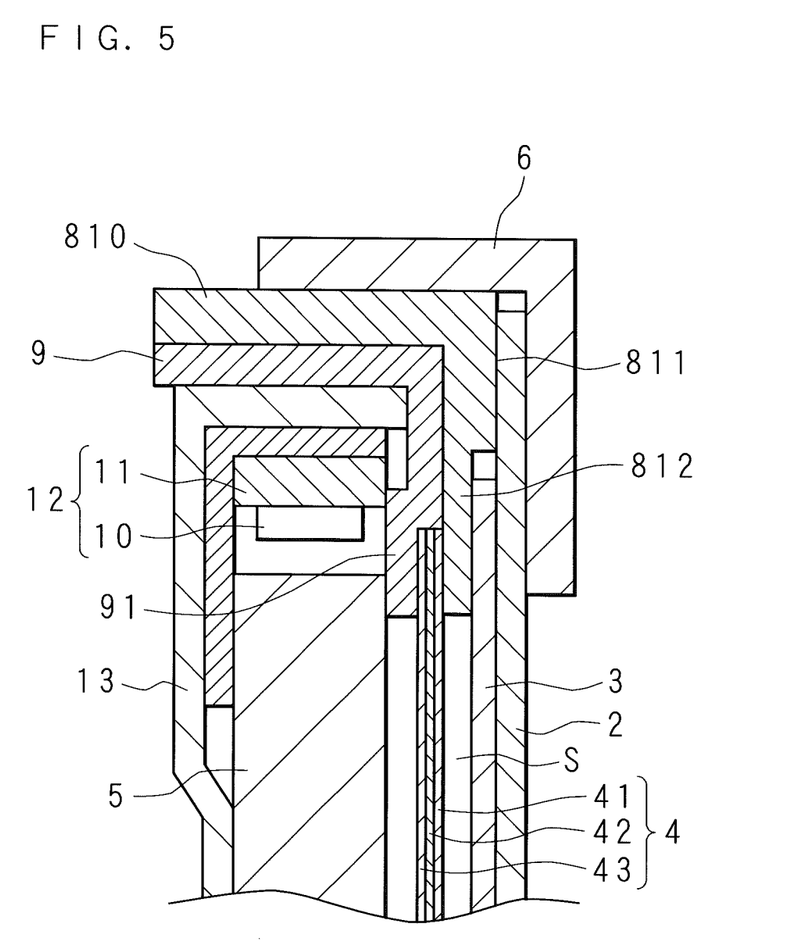
FIG. 5 is a partial vertical cross sectional view illustrating the configuration of the main part of a liquid-crystal display device according to Embodiment 3 of the present invention.

FIG. 5 is a partial vertical cross sectional view illustrating the configuration of the main part of a liquid-crystal display device 1 according to Embodiment 3 of the present invention.

In the liquid-crystal display device 1 according to Embodiment 3 of the present invention, as illustrated in FIG. 5, an optical sheet member 4 is located on the rear side of a rectangular liquid-crystal panel 2 having one surface at the front side on which an image is displayed, and a diffusion sheet 3 is provided between the liquid-crystal panel 2 and the optical sheet member 4. Furthermore, in the other surface side of the optical sheet member 4, a light source 10 and a light guide plate 5 are located, the light source 10 and the light guide plate 5 being accommodated in a cabinet 13.

In the rear side of the liquid-crystal panel 2, a spacer 810 for supporting the liquid-crystal panel 2 is provided to be in contact with the circumferential part of the other surface of the liquid-crystal panel 2. The spacer 810 has a hollow rectangular shape, and has a contact surface 811, which is in contact with the circumferential part of the other surface of the liquid-crystal panel 2, on one surface in the side of the liquid-crystal panel 2.

Furthermore, the spacer 810 has a holding step 812, formed at the end of the spacer 810 lower than the contact surface 811, for holding the diffusion sheet 3, the height of the holding step 812 in the front-back direction of the liquid-crystal panel 2 has a dimension equal to the thickness of the diffusion sheet 3.

In other words, the diffusion sheet 3 is so held that the circumferential part of its other surface is in contact with the stepped surface of the holding step 812. More specifically, as described above, the circumferential part of the other surface of the liquid-crystal panel 2 is in contact with the contact surface 811 while the holding step 812 has a height with a dimension equal to the thickness of the diffusion sheet 3. Thus, when the circumferential part of the other surface of the diffusion sheet 3 is in contact with the stepped surface of the holding step 812, the front surface of the diffusion sheet 3 makes contact with the above-described other surface of the liquid-crystal panel 2. Accordingly, while being in contact with each other, the liquid-crystal panel 2 and the diffusion sheet 3 are held between the spacer 810 and an outer cover 6.

The diffusion sheet 3 diffuses the light from the light source 10 entering through the optical sheet member 4 to emit the light to the liquid-crystal panel 2. The diffusion sheet 3 is made of, for example, DBEF (registered trademark). The diffusion sheet 3 has a substantially rectangular shape and is at least larger than the display area of the liquid-crystal panel 2.

The optical sheet member 4 itself is a known material. It includes, for example, a first diffusion sheet 41 located in the other surface side of the diffusion sheet 3, a prism sheet 42 located on the rear side of the first diffusion sheet 41, and a second diffusion sheet 43 located on the rear side of the prism sheet 42.

As the diffusion sheet 3 and the optical sheet member 4 are the same as the diffusion sheet 3 and the optical sheet member 4 in Embodiment 1, detailed description thereof will not be repeated here.

The second diffusion sheet 43 diffuses the light entering from the light source 10 through the light guide plate 5 in the other surface side of the second diffusion sheet 43 and makes the light enter the prism sheet 42, and the prism sheet 42 condenses the light entering through the second diffusion sheet 43 and emits the light toward the diffusion sheet 3. The light that passed through the prism sheet 42 enters the first diffusion sheet 41 vertically with respect to the prism sheet 42. The first diffusion sheet 41 further diffuses the light entering through the prism sheet 42 to make the luminance distribution more uniform, and emits the light toward the diffusion sheet 3.

Moreover, as illustrated in FIG. 5, the optical sheet member 4 is held between the holding part 9 (bent part 91) and the spacer 810. Accordingly, as in the case of Embodiment 1, a gap S is formed between the optical sheet member 4 and the diffusion sheet 3, the gap S being, for example, 0.5 mm.

The other parts similar to those in Embodiment 1 are denoted by the same reference numbers and will not be described in detail.

The liquid-crystal display device 1 according to Embodiment 3 has a configuration as described above. Thus the unevenness in light caused by warps or wrinkles generated in the optical sheet member 4 because the optical sheet member 4 is expanded by the heat generated from the light source 10 can be eliminate.

Accordingly, in the case where unevenness occurs in the light emitted from the optical sheet member 4, such unevenness in light is alleviated by the diffusion sheet 3 and gap S as described above, and is not viewed by the user at the front side of the liquid-crystal panel 2, which will not make the user feel uncomfortable.

Furthermore, in the liquid-crystal display device 1 according to Embodiment 3, as the liquid-crystal panel 2 and the diffusion sheet 3 are held while being in contact with each other, the thermal capacity of the diffusion sheet 3 itself can simulatively be increased, thereby suppressing elongation of the diffusion sheet 3 due to thermal expansion. Moreover, the thickness in the front-back direction of the liquid-crystal display device 1 can be reduced and thus the liquid-crystal display device 1 can be downsized.

Embodiment 4

Figure 6:
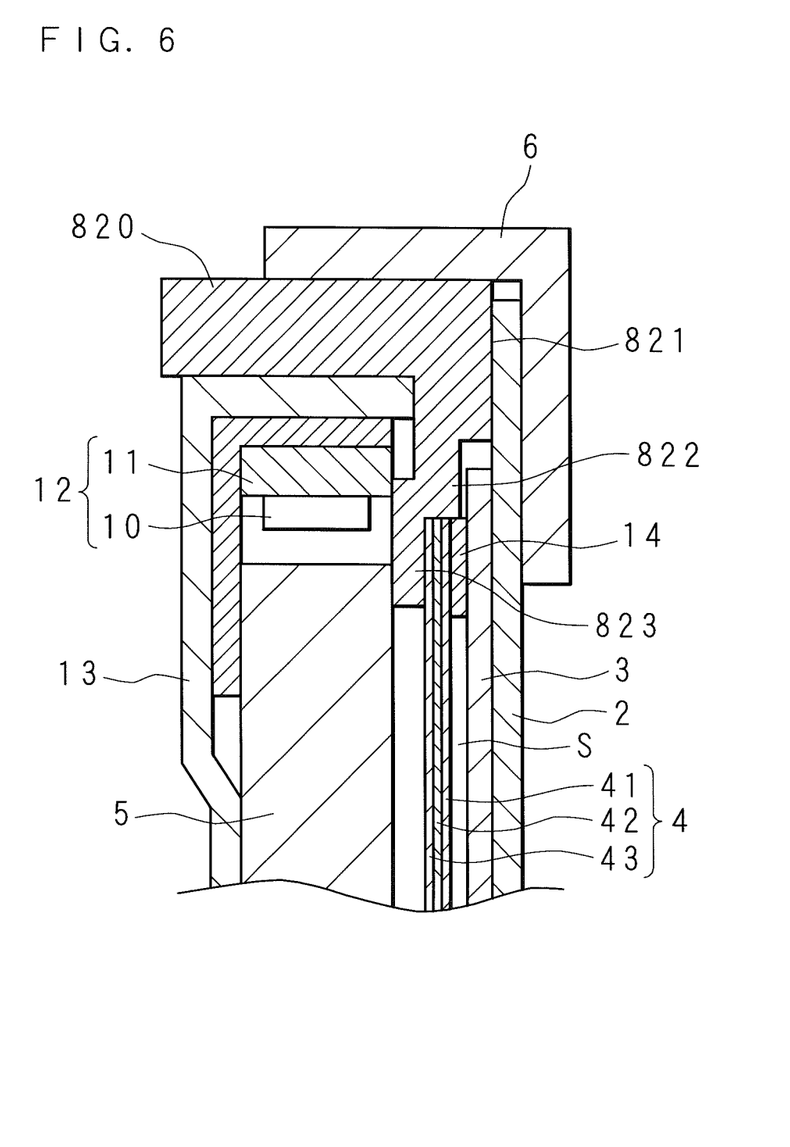
FIG. 6 is a partial vertical cross sectional view illustrating the configuration of the main part of a liquid-crystal display device according to Embodiment 4 of the present invention.

FIG. 6 is a partial vertical cross sectional view illustrating the configuration of the main part of a liquid-crystal display device 1 according to Embodiment 4 of the present invention.

In the liquid-crystal display device 1 according to Embodiment 4 of the present invention, as illustrated in FIG. 6, an optical sheet member 4 is located in the rear side of a rectangular liquid-crystal panel 2 which displays an image at one surface on the front side thereof, and a diffusion sheet 3 is provided between the liquid-crystal panel 2 and the optical sheet member 4. Moreover, in the other surface side of the optical sheet member 4, a light source 10 and a light guide plate 5 are located, the light source 10 and the light guide plate 5 being accommodated in a cabinet 13.

In the rear side of the liquid-crystal panel 2, a support 820 is provided, which is in contact with the circumferential part of the other surface of the liquid-crystal panel 2 and supports the liquid-crystal panel 2. The support 820 has a hollow rectangular shape, one surface of the support 820 having a contact surface 821 making contact with the circumferential part of the other surface of the liquid-crystal panel 2.

Moreover, at the support 820, a first step 822 at which the circumferential part of the diffusion sheet 3 is located is formed below the contact surface 821, the height of the first step 822 in the front-back direction of the liquid-crystal panel 2 being equal to or slightly larger than the dimension of the thickness of the diffusion sheet 3.

Furthermore, at the support 820, a second step 823 is formed at an end part lower than the first step 822, to hold the optical sheet member 4, the outer end part of the support 820 extending toward the rear side. The height of the second step 823 in the front-back direction of the liquid-crystal panel 2 is equal to or slightly larger than the dimension of the thickness of the optical sheet member 4. The stepped surface of the second step 823 is configured to be in contact with the other surface of the circumferential part of the optical sheet member 4.

Moreover, a spacer frame 14 is interposed between the circumferential part of the diffusion sheet 3 and the circumferential part of the optical sheet member 4. The spacer frame 14 has a hollow rectangular shape and has the same vertical and horizontal dimensions as those of the optical sheet member 4, with the thickness of 0.5 mm, for example.

In other words, when the other surface of the circumferential part of the optical sheet member 4 is in contact with the stepped surface of the second step 823, the spacer frame 14 is interposed between the circumferential part of one surface of the optical sheet member 4 and the circumferential part of the other surface of the diffusion sheet 3.

Moreover, it is configured here that one surface of the diffusion sheet 3 and the other surface of the liquid-crystal panel 2 are in contact with each other. This allows the optical sheet member 4, diffusion sheet 3 and liquid-crystal panel 2 are held together.

In other words, in the state where the spacer frame 14 is interposed between the diffusion sheet 3 and the optical sheet member 4 while a gap S is formed, the above-described other surface of the liquid-crystal panel 2 is in contact with one surface of the diffusion sheet 3. Here, the circumferential part of the other surface of the optical sheet member 4 is pressed against the liquid-crystal panel 2 side by the second step 823, and the circumferential part of the above-described one surface of the liquid-crystal panel 2 is pressed against the optical sheet member 4 side by the outer cover 6. It is thus configured that the optical sheet member 4, diffusion sheet 3 and liquid-crystal panel 2 are held between the support 820 and the outer cover 6.

The diffusion sheet 3 diffuses the light from the light source 10 entering through the optical sheet member 4 and emits the light to the liquid-crystal panel 2. The diffusion sheet 3 is made of, for example, DBEF (registered trademark). The diffusion sheet 3 has a substantially rectangular shape and is at least larger than the display area of the liquid-crystal panel 2.

The optical sheet member 4 itself is a known material. For example, it includes the first diffusion sheet 41 located in the other surface side of the diffusion sheet 3, a prism sheet 42 located in the rear side of the first diffusion sheet 41, and the second diffusion sheet 43 located on the rear side of the prism sheet 42.

The diffusion sheet 3 and optical sheet member 4 are the same as the diffusion sheet 3 and optical sheet member 4 in Embodiment 1, and thus will not be described in detail.

The second diffusion sheet 43 diffuses the light entering from the light source 10 through the light guide plate 5 in the other surface side of the second diffusion sheet 43 and makes the light enter the prism sheet 42, and the prism sheet 42 condenses the light entering through the second diffusion sheet 43 and emits the light toward the diffusion sheet 3. The light that passed through the prism sheet 42 enters the first diffusion sheet 41 vertically with respect to the prism sheet 42. The first diffusion sheet 41 further diffuses the light entering through the prism sheet 42 to make the luminance distribution more uniform and emits the light toward the diffusion sheet 3.

The other parts similar to those in Embodiment 1 will be denoted by the same reference numbers and will not be described in detail.

As the liquid-crystal display device 1 according to Embodiment 4 has a configuration as described above. Thus the unevenness in light caused by warps or wrinkles generated in the optical sheet member 4 because the optical sheet member 4 is expanded by heat generated by the light source 10 can be eliminate.

Therefore, even in the case where unevenness occurs in the light emitted from the optical sheet member 4, such unevenness in light is alleviated by the diffusion sheet 3 and the gap S as described above, and is not viewed by the user at the front side of the liquid-crystal panel 2, which will not make the user feel uncomfortable.

Furthermore, in the liquid-crystal display device 1 according to Embodiment 4, the liquid-crystal panel 2 and the diffusion sheet 3 are held while being in contact with each other, which can simulatively increase the thermal capacity of the diffusion sheet 3 itself, and can suppress elongation of the diffusion sheet 3 due to thermal expansion. Moreover, the thickness in the front-back direction of the liquid-crystal display device 1 can be reduced and thus the liquid-crystal display device 1 can be downsized.

Moreover, as the optical sheet member 4, diffusion sheet 3 and liquid-crystal panel 2 are held only by the support 820 and outer cover 6, the number of parts can be reduced, which facilitates the assembly procedure.

What is claimed is:

1. A display device comprising:
    a liquid-crystal panel with one surface on which an image is displayed;
    an optical sheet member disposed opposite to another surface of the liquid-crystal panel and comprising multiple stacked optical sheets emitting light from a light source toward the liquid-crystal panel; and
    a diffusion sheet, provided between the liquid-crystal panel and the optical sheet member, for diffusing light entering through the optical sheet member and making the light enter the liquid-crystal panel,
    wherein the diffusion sheet comprises a first surface in contact with the another surface of the liquid-crystal display panel and a second surface opposed to a first surface of the optical sheet member, and the optical sheet member comprises an optical sheet member-diffusion sheet, located on the diffusion sheet side so as to constitute the first surface of the optical sheet member to be directly opposed to the diffusion sheet, for diffusing the light from the light source and emitting the light to the diffusion sheet, and a gap is formed between the diffusion sheet and the optical sheet member-diffusion sheet.

2. The display device according to claim 1, comprising a spacer supporting the liquid-crystal panel and the diffusion sheet, and forming the gap between the diffusion sheet and the optical sheet member-diffusion sheet, wherein
    the spacer includes:
    a contact surface being in contact with a circumferential part of said another surface of the liquid-crystal panel; and
    a step at which a circumferential part of the diffusion sheet is positioned.

3. The display device according to claim 1, comprising:
    a support for supporting the liquid-crystal panel, the diffusion sheet and the optical sheet member; and
    a spacer frame located between the diffusion sheet and the optical sheet member-diffusion sheet, and forming the gap,
    wherein the support includes:
    a contact surface being in contact with a circumferential part of said another surface of the liquid-crystal panel;
    a first step at which a circumferential part of the diffusion sheet is positioned; and
    a second step at which a circumferential part of the optical sheet member is positioned.

4. The display device according to claim 3, wherein the second step comprises a second surface in contact with a light guide plate.

5. The display device according to claim 1, wherein the diffusion sheet is larger than the display area of the liquid-crystal panel.

6. The display device according to claim 1, wherein the display device further comprises a spacer comprising a flat part comprising a first surface in contact with the second surface of the diffusion sheet and a second surface in contact with the first surface of the optical sheet member.

7. The display device according to claim 6, wherein the display device further comprises a holding part comprising a bent part, wherein the bent part comprises a first surface in contact with a second surface of the optical sheet member and a second surface in contact with a light guide plate.

* * * * *